United States Patent
Lampin

(10) Patent No.: US 11,778,036 B2
(45) Date of Patent: Oct. 3, 2023

(54) MANAGEMENT OF COMMUNICATION BETWEEN A TERMINAL AND A NETWORK SERVER

(71) Applicant: ORANGE, Issy-les-Moulineaux (FR)

(72) Inventor: Quentin Lampin, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 457 days.

(21) Appl. No.: 16/637,955

(22) PCT Filed: Aug. 8, 2018

(86) PCT No.: PCT/FR2018/052037
§ 371 (c)(1),
(2) Date: Feb. 10, 2020

(87) PCT Pub. No.: WO2019/030457
PCT Pub. Date: Feb. 14, 2019

(65) Prior Publication Data
US 2020/0213401 A1 Jul. 2, 2020

(30) Foreign Application Priority Data

Aug. 11, 2017 (FR) .................................. 1757658

(51) Int. Cl.
*H04L 12/70* (2013.01)
*H04L 67/141* (2022.01)
(Continued)

(52) U.S. Cl.
CPC .............. *H04L 67/141* (2013.01); *H04L 9/32* (2013.01); *H04L 12/66* (2013.01); *H04L 63/061* (2013.01);
(Continued)

(58) Field of Classification Search
CPC ......... H04L 67/141; H04L 9/32; H04L 12/66; H04L 63/061; H04L 67/146;
(Continued)

(56) References Cited

U.S. PATENT DOCUMENTS 4,288,659 A * 9/1981 Atalla ................... H04L 9/0891
235/382
4,503,287 A * 3/1985 Morris ...................... H04L 9/14
380/259
(Continued)

FOREIGN PATENT DOCUMENTS

WO 2016001316 A1 1/2016
WO WO-2016001316 A1 * 1/2016 ........ H04W 36/0016

OTHER PUBLICATIONS

Jaehyu Kim et al, "A Dual Key-Based Activation Scheme for Secure LoRaWAN", Apr. 28, 2017 (Apr. 28, 2017), XP055416927.
(Continued)

Primary Examiner — Ario Etienne
Assistant Examiner — Elizabeth Kassa
(74) Attorney, Agent, or Firm — David D. Brush; Champlin & Koehler, P.A.

(57) ABSTRACT

A management method implemented by a transmission device capable of communicating via a radio link with a piece of gateway equipment of a telecommunications network and configured for communicating with a network server of the network. The method includes: receiving a management request of a terminal capable of communicating via the radio link with a piece of gateway equipment of the network and having established a communication session with the network server, at least one session key being shared between the terminal and the network server, the management request containing an identifier of the terminal and the session key; intercepting, following reception of the management request, at least one message sent by the
(Continued)

terminal; and transmitting, in response to the message, at least one response message encrypted with the session key received. A transmission device implementing the method is also provided.

12 Claims, 4 Drawing Sheets

(51) Int. Cl.
| | |
|---|---|
| *H04W 76/10* | (2018.01) |
| *H04L 9/32* | (2006.01) |
| *H04L 12/66* | (2006.01) |
| *H04L 9/40* | (2022.01) |
| *H04L 67/146* | (2022.01) |
| *H04W 84/18* | (2009.01) |
| *H04W 88/16* | (2009.01) |

(52) U.S. Cl.
CPC .......... *H04L 67/146* (2013.01); *H04W 76/10* (2018.02); *H04W 84/18* (2013.01); *H04W 88/16* (2013.01)

(58) Field of Classification Search
CPC .... H04L 67/125; H04W 76/10; H04W 84/18; H04W 88/16; H04W 4/70; H04W 12/37; H04W 76/14; H04W 12/04
USPC ......................................................... 713/171
See application file for complete search history.

(56) References Cited

U.S. PATENT DOCUMENTS

| | | | | |
|---|---|---|---|---|
| 5,600,722 | A * | 2/1997 | Yamaguchi | H04L 9/0838 713/162 |
| 7,853,251 | B2 * | 12/2010 | Sehedic | H04W 56/002 455/450 |
| 10,827,345 | B1 * | 11/2020 | Tandon | H04L 61/1511 |
| 2008/0301437 | A1 * | 12/2008 | Chevallier | H04N 21/47202 348/E7.071 |
| 2010/0042691 | A1 * | 2/2010 | Maguire | G06F 1/3203 709/206 |
| 2013/0111550 | A1 * | 5/2013 | Naveh | H04L 67/2838 709/217 |
| 2013/0197946 | A1 * | 8/2013 | Hurry | G06Q 50/22 705/4 |
| 2014/0122878 | A1 * | 5/2014 | Cho | H04L 67/02 713/168 |
| 2015/0020157 | A1 * | 1/2015 | Kim | H04W 12/062 455/517 |
| 2016/0072806 | A1 * | 3/2016 | Kim | H04W 12/50 726/5 |
| 2017/0012950 | A1 * | 1/2017 | Kim | H04W 4/12 |
| 2017/0230832 | A1 * | 8/2017 | Ophir | H04L 63/102 |
| 2019/0052609 | A1 * | 2/2019 | Skuratovich | H04L 63/0428 |
| 2019/0059039 | A1 * | 2/2019 | Centonza | H04W 76/19 |

OTHER PUBLICATIONS

International Search Report dated Oct. 10, 2018 for corresponding International Application No. PCT/FR2018/052037, filed Aug. 8, 2018.
Written Opinion of the International Searching Authority dated Oct. 10, 2018 for corresponding International Application No. PCT/FR2018/052037, filed Aug. 8, 2018.
English translation of the Written Opinion of the International Searching Authority dated Oct. 18, 2018 for rresponding International Application No. PCT/FR2018/052037, filed Aug. 8, 2018.

* cited by examiner

MANAGEMENT OF COMMUNICATION BETWEEN A TERMINAL AND A NETWORK SERVER

CROSS-REFERENCE TO RELATED APPLICATIONS

This application is a Section 371 National Stage Application of International Application No. PCT/FR2018/052037, filed Aug. 8, 2018, the content of which is incorporated herein by reference in its entirety, and published as WO 2019/030457 on Feb. 14, 2019, not in English.

FIELD OF THE DISCLOSURE

The invention lies in the field of telecommunications.

The invention relates more particularly to a communication system in which a terminal communicates with an application server able to provide application services to this terminal by way of a telecommunications network, and more particularly of a server of this network. No limitation is attached to the nature of the terminal or to the nature of the application services provided. The terminal can be a fixed or mobile terminal, such as an electric meter, a sensor, etc. The application server can be operated by any provider of services, such as for example an electricity provider, water provider, etc.

The invention also has a favored but nonlimiting application in the context of the Internet of Things, and in particular in wide area architectures or networks of LoRaWAN™ (for "Long Range Wide Area Network") type. In a known manner, the LoRaWAN™ protocol currently undergoing standardization allows radio communication at low bitrate (less than 50 kbit/s) with low energy consumption, of objects communicating according to LoRa™ (for "Long range") technology and connected to the Internet via a communication network.

BACKGROUND OF THE DISCLOSURE

In an architecture of LoRaWAN™ type, each terminal is obliged to communicate with an application server via a telecommunications network. More particularly, the data sent by each terminal, via a radio link, are received by a plurality of gateways or base stations which relay them to a server of the network, via a wired or cellular connection. This server of the network filters the messages received from the terminals (and verifies in particular their provenance and their integrity), and retransmits them to the application servers concerned.

Despite a radio technology that is optimized for a long range, numerous terminals designed to operate according to the LoRa™ technology do not succeed in communicating with the gateways of the desired Lora™ network since the signals sent by these terminals do not reach the gateways. Such is the case in particular when these terminals are for example positioned in zones such as basements, cellars, buildings made of sheet metal, etc.

In a known manner, additional gateways can be added to the network LoRa™ to allow these terminals to communicate with this network.

However, these gateways are expensive. Moreover, they need to be plugged into the mains and require a cellular or wired connection.

Moreover, it has been noted that certain terminals connected to the network because they were initially positioned in a zone covered by a base station may lie in a zone not covered by a base station.

This situation occurs for example when conveying a terminal from a client's establishment where it is configured to its final place of installation.

Indeed, subsequent to its configuration, the terminal sends requests for connection so as to communicate with a network server of the LoRa network. If while it is being moved, it is situated, even momentarily, in a zone covered by a gateway of the LoRa network, the connection procedure can be carried out. Once connected, in certain embodiments, the terminal preserves the connection information until its possible reinitialization.

This poses problems if the final place of installation is not situated in a zone of radio coverage of the gateway equipments of the LoRa network.

SUMMARY

One of the aims of the invention is to remedy inadequacies/drawbacks of the prior art and/or to afford improvements thereto.

To this end, the invention pertains to a management method.

According to the invention, the management method comprises the following steps implemented by a transmission device able to communicate via a radio link with a gateway equipment forming a node of a telecommunication network and configured to communicate with an associated management server via said gateway equipment and via a network server of said network:

reception from said management server of a request for management of a terminal able to communicate via a radio link with a gateway equipment of the network and configured to communicate with an associated application server via the gateway equipment of the network and via said network server and having established a communication session with the network server and/or the application server, at least one session key being shared between the terminal and the network server and/or the application server, said request for management containing at least one identifier of said terminal and said at least one session key;

subsequent to the reception of the request for management, interception of at least one message sent by said terminal and sending, in response to said message, of at least one response message encrypted with said session key received.

Correlatively, the invention also pertains to a transmission device able to communicate via a radio link with a gateway equipment forming a node of a telecommunication network and configured to communicate with an associated management server via said gateway equipment and via a network server of said network.

According to the invention, this device comprises:

a reception module for receiving from said management server, a request for management of a terminal able to communicate via a radio link with a gateway equipment of the network and configured to communicate with an associated application server via the gateway equipment of the network and via the network server and having established a communication session with the network server and/or the application server, at least one session key being shared between the terminal and the network server and/or the application server, said request for management containing at least one identifier of said terminal and said at least one session key;

a processing module configured to receive, subsequent to the reception of the request for management, at least one message sent by said terminal and a sending module for sending, in response to said message, at least one response message encrypted with said session key received.

During a first phase, a terminal situated in the zone of radio coverage of a gateway equipment of the network establishes a communication session with a network server of the network and/or with an application server associated with the terminal. This communication session allows the terminal to communicate via the network server with an application server associated with the terminal.

During a second phase during which the terminal is situated outside of the zone of radio coverage of a gateway equipment of the network, the radio signals sent by the terminal are not received by any gateway equipment of the network. Therefore, they do not reach the application server.

A request for management transmitted by a management server to a transmission device positioned in the zone of coverage of the terminal allows this transmission device to relay on the one hand the messages sent by a terminal to a gateway equipment and on the other hand the messages intended for this terminal.

Subsequent to the reception of this request for management, the transmission device intercepts at least one message sent by the terminal.

By virtue of the session key received in the request for management, it can send, in response to a message sent by the terminal, one or more messages destined for the terminal. These messages are encrypted with the session key. They are similar to the messages which are sent by the network server.

The terminal can thus continue to communicate with the application server via the network server. It is not necessary to intervene on site to reinitialize the terminal.

The transmission device processes only the messages originating from terminals for which it has obtained management rights. These management rights are here transmitted in the form of a request for management.

The transmission device, also called repeater device, is positioned in the zone of radio coverage of the terminal so as to allow this terminal to access the network and to communicate with an application server associated with the terminal via the network server. By virtue of this transmission device, a terminal configured to connect to the network but unable to access a gateway equipment of the network directly via a radio link, can communicate with the network server and consequently with an application server via the network server.

The network is for example a LoRa™ network.

The transmission device behaves as a terminal in relation to the network. Thus, it communicates with a gateway equipment via radio signals, for example long-range radio signals. The gateway equipment relays the information coming from the transmission device to the network server. The network server is thereafter able to relay this information to a management server associated with the transmission device if the information is intended for this server. Reciprocally, the information originating from the management server and intended for the transmission device is transmitted to this device via the network server or servers and via the gateway equipment.

Advantageously, the communications links between the various servers and between a server of the network and a gateway equipment are conventional wired or cellular links. However, no limitation is placed on the type of these links.

Advantageously, the link between the transmission device and the terminal is a long-range radio link according to the LoRa technology. Thus, the terminals configured to comply with the LoRaWAN™ protocol can, via a LoRa network, access application servers via the transmission device without it being necessary to adapt them.

However, the link between the transmission device and the terminal can be a radio link having different characteristics, for example a short-range radio link.

In one embodiment, a communication session is established between the transmission device and the network server.

This session establishment can comprise a mutual authentication between the transmission device and the network server and/or be based on shared secrets, typically a key.

This session is for example established subsequent to the sending by the transmission device of a connection request.

This communication session allows the transmission device, and a management server which is identified in the request for connection, to communicate via the network server in a secure manner. The management server represents an application server associated with the transmission device.

According to a particular embodiment of the management method, the request for management is received via said gateway equipment and via the network server. Thus, the transmission device receives the request for management via a radio link. It is therefore not necessary to provide for other means of communication, such as for example a wired link, a 4G link, etc. between the transmission device and the management server.

Advantageously, the request for management is transmitted subsequent to the establishment of a communication session between the transmission device and the network server and/or the management server. This allows secure dispatching of the request for management.

According to a particular embodiment of the management method, said at least one response message contains at least one configuration parameter of the terminal, and more particularly of a radio communication module of the terminal.

The dispatching of configuration parameters allows the terminal to adapt the configuration of the radio signals sent or received by the terminal to the constraints of the transmission device. This adaptation makes it possible to optimize the radio link between the terminal and the transmission device.

According to a particular characteristic, said at least one configuration parameter comprises a list of at least one radio channel to be validated or invalidated by the terminal.

According to a particular configuration, the terminal sends each message to be sent, successively on several channels with the aim that an equipment receive this message on one of the channels on which it is listening.

During the establishment of a communication session between a terminal and an equipment, for example a server, this equipment can provide the terminal with a list of channels on which it listens or on the contrary a list of channels on which it never listens. These lists are related to the capabilities of the equipment.

The transmission by the transmission device that received the request for management of a list of channels to be validated or invalidated allows the terminal to adapt the radio link to the capabilities of the transmission device.

According to another particular characteristic, used alone or in combination with that above, said at least one configuration parameter comprises at least one lag value to be complied with between a message sent and a message received by the terminal.

During the establishment of a communication session between a terminal and an equipment, this equipment can indicate to the terminal a lag within which it envisages responding. During a communication session established between a terminal and a gateway equipment, this response lag is for example of the order of a second.

When the terminal communicates with the network server via a transmission device, this initially configured lag might not be sufficient, for example to carry out a relaying of the messages. The dispatching of a new lag value allows the terminal to adapt its moments of listening for a response after sending of a message. This makes it possible for example to lengthen the waiting lag or to shift it in time.

According to a particular embodiment of the management method, said at least one response message contains a request for sending by said terminal of a request for connection.

The aim of dispatching a request for connection to the terminal is to cause the dispatching of a new request for connection by the terminal and, consequently, the establishment of a new communication session. During this establishment of communication session, one or more session keys will be generated. This makes it possible to avoid the piracy of the session key or keys generated previously and transmitted to the transmission device in the request for management. Security is thus strengthened.

This embodiment is particularly adapted to the terminals not configured to send on their own initiative a new connection request when they no longer receive responses to the messages that they send.

The dispatching of a request for connection to the terminal makes it possible to rapidly establish a new session.

According to a particular embodiment of the management method, the request for management contains authentication data allowing establishment by said transmission device of a communication session with the terminal.

The transmission of authentication data allows the transmission device to substitute itself for the network server so as to establish with the terminal a communication session with the terminal.

According to a particular embodiment, the management method comprises, subsequent to the sending of said at least one response message, a step of receiving a request for connection sent by said terminal and a step of establishing a communication session between said terminal and said transmission device.

According to a particular embodiment, the management method comprises, subsequent to the establishment of the communication session between said terminal and said transmission device, a step of dispatching to the network server, establishment data of said communication session.

These session establishment data are data used to establish the communication session between the terminal and the transmission device. These data are data generated by the terminal and communicated by the latter to the transmission device or data generated by the transmission device.

These session establishment data contain for example the session key or data, for example one or more random values, necessary for calculating the session key.

By virtue of the session establishment data, the network server can act as if it had itself established the communication session.

The communication between the terminal and an associated application server, via the network server, is thus carried out in a manner transparent to the terminal and to the application server.

In a particular embodiment, the network server transfers the data received to the management server. This management server interprets the reception of these data as a proof of the connection of the terminal to the network. It then informs the network server of this connection by communicating to it information relating to this connection. This information is recorded in a memory accessible by the network server. Thus, the network server will not reject the messages intended for the application server sent by this terminal.

The session establishment data can also be transmitted to the application server by the management server.

Subsequent to the making available by the management server, of the establishment session data, the network server and optionally the application server have at their disposal the same information as that which would have been obtained by the network server and the application server in the case of a direct connection of a terminal with a gateway equipment, that is to say in the case of a terminal situated in the zone of coverage of a gateway equipment.

Advantageously, the recorded connection information contains the session key or keys generated session for this connection. The network server can, by virtue of this session key, authenticate, encrypt and decrypt the data messages originating from or destined for the terminal and retransmitted in each direction by the transmission device.

After this connection phase, the transmission device retransmits via the network destined for the application server, the messages intended for this application server and sent by the terminal. In a symmetric manner, the transmission device retransmits to the terminal the messages intended for this terminal and transmitted via the network by the application server. In an equivalent manner, the transmission device retransmits to the network server, the messages intended for this network server and sent by the terminal, as well as the messages originating from the network server destined for the terminal.

This transmission device thus allows the terminal to communicate with the network and the application server to which it is attached. It thus plays the role of relay.

No modification is necessary at the level of the terminal.

The transmission device is inexpensive. It is not necessary that it comprise a wired or cellular connection module. It communicates on the one hand with one or more terminals and on the other hand with a network gateway via a radio link. In this means of communication the transmission device consumes little energy. Thus, it is not necessary to plug the transmission device into an electric current socket. A battery or cells are sufficient to power it. This facilitates its installation.

According to a particular characteristic of the management method, the request for management is received in response to a message sent by the transmission device.

This embodiment is particularly adapted to the case where the server of the network cannot directly interrogate the terminals connected to the network, and more particularly here the transmission device. In this embodiment, the transmission device periodically sends messages intended for the network server. The network server can then communicate information to the transmission device by responding to such a message.

The invention also pertains to a computer program product comprising instructions for the implementation of a management method such as described above, when this program is executed by a processor.

The invention thus relates to an item of software or program, liable to be executed by a computer or by a data processor, this software/program comprising instructions for controlling the execution of the steps of a management method. These instructions are intended to be stored in a memory of a computing device, loaded and then executed by a processor of this computing device.

This software/program can use any programming language, and be in the form of source code, object code, or of code intermediate between source code and object code, such as in a partially compiled form, or in any other desirable form.

The computing device can be implemented by one or more physically distinct machines and globally exhibits the architecture of a computer, including constituents of such an architecture: data memory (memories), processor(s), communication buses, hardware interface(s) for connecting this computing device to a network or other equipment, user interface(s), etc.

The invention also relates to an information medium readable by a data processor, and comprising instructions of a program such as is mentioned hereinabove. The information medium can be any entity or device capable of storing the program.

BRIEF DESCRIPTION OF THE DRAWINGS

Other particularities and advantages of the present invention will become apparent in the following description of embodiments which are given by way of nonlimiting example, with reference to the appended drawings, in which.

DETAILED DESCRIPTION OF ILLUSTRATIVE EMBODIMENTS

The invention is implemented by means of software components and/or hardware components. In this regard, the term "module" can correspond in this document either to a software component, or to a hardware component or to a set of hardware components and/or software components, which is able to implement a function or a set of functions, according to what is described hereinbelow for the module concerned.

A software component corresponds to one or more computer programs, one or more subprograms of a program, or more generally to any element of a program or of an item of software. Such a software component is stored in memory and then loaded and executed by a data processor of a physical entity (terminal, server, gateway, set-top-box, router, etc) and is liable to access the hardware resources of this physical entity (memories, recording media, communication buses, electronic input/output cards, user interfaces, etc).

In the same manner, a hardware component corresponds to any element of a hardware set. It may entail a programmable hardware component or one with integrated processor for the execution of software, for example an integrated circuit, a chip card, an electronic card for the execution of firmware, etc.

Figure 1:
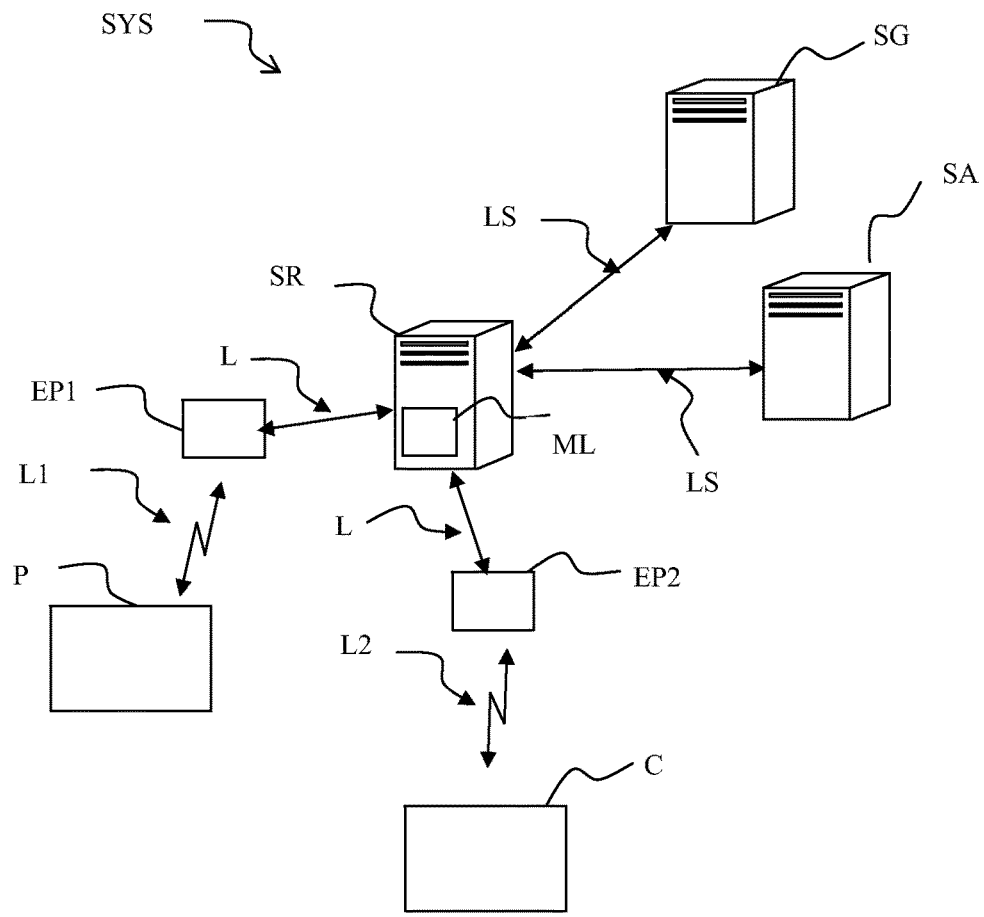
FIG. 1 is a diagram illustrating a system in a first configuration state and according to a particular embodiment of the invention.

FIG. 1 represents a communication system SYS in accordance with the invention, in a particular embodiment.

In the example envisaged in FIG. 1, the communication system SYS relies on an extended telecommunications network implementing the LoRaWAN™ protocol. In a known manner, the LoRaWAN™ protocol is particularly well adapted in the context of the Internet of Things to allow diverse communicating objects to exchange with servers over the Internet.

No limitation is attached to the nature of the communicating objects. It may entail diverse terminals such as sensors, actuators, or any other type of object. In a known manner, such objects, through their hardware constraints and/or software constraints, cannot connect through conventional access networks such as Wifi, cellular or wired to the Internet network to access the application servers to which they are attached: they communicate with these servers by way of a telecommunications network adapted to their constraints, such as LoRaWAN™, according to a star topology.

The communication system SYS comprises at least one transmission device P, at least one terminal C, at least one gateway equipment, a network server SR, a management server SG and at least one application server SA.

The communication system SYS comprises for example 2 gateway equipments EP1 and EP2.

No limitation is attached to the number of application servers, to the number of transmission devices, to the number of gateway equipments or to the number of terminals.

The network server SR is able to communicate on the one hand with the management server SG and on the other hand with the application server SA via a link LS.

The link LS is for example a wired link.

The link LS is preferably secure.

The gateway equipment EP1, respectively the gateway equipment EP2, is able on the one hand to communicate with one or more terminals via a radio linkup and on the other hand, to communicate with the network server SR or other equipments of the network via a communication link L.

The communication link L is for example a wired or cellular link.

No limitation is placed either on the type of the link LS or on the type of the link L.

In a known manner, the network server SR is charged with filtering and checking the integrity and the authenticity of the messages received via the link L before transmitting them to the application servers concerned.

The network server SR also has access to a memory ML containing a list LT of connected terminals. The list LT comprises in particular for each connected terminal, an identifier of said terminal in association with information relating to the communication session established for this terminal. This information is for example an identifier of the application server with which it is connected, one or more session keys, an address allocated to the connected terminal, etc.

The information contained in the list LT allows the network server SR to perform integrity checks before transmitting or not transmitting a received message.

The information recorded for a connected terminal is for example removed from the list LT at the end of the communication session.

It is immaterial whether the data exchanged between the various servers SR, SA and SG of the network R are encrypted with shared keys or private-public key pairs or any other encryption method or are transmitted in the clear. No limitation is placed on the way in which these data are exchanged.

The terminal C is configured to communicate with the application server SA via the network server SR, and optionally via gateways or base stations.

More precisely, the terminal C is configured to send and to receive data via a radio linkup.

The terminal C is for example a water meter.

The application server SA is for example a server of a water provider able to process the data uploaded by the water meter C and to provide an application service. This application service is for example the computation of a bill on the basis of the uploaded data, and the provision of this bill to a user associated with the meter C. The user may moreover be provided with a detailed history of their consumption on a web portal of the water provider, etc.

The terminal C is configured to communicate with the application server SA via the network server SR, and optionally via gateways or base stations.

This signifies that when it is installed in a zone of radio coverage of a gateway equipment, for example the gateway equipment EP2, it can communicate with the application server SA via a radio link L2 between the terminal and this gateway equipment EP2, via the gateway equipment EP2, the link L, the network server SR and the link LS.

To this effect, the terminal C comprises a memory in which an identifier IdC of the terminal C, an identifier IdS of the application server SA associated with the terminal C and a main (or master) cryptographic key KPC have been recorded during a prior initialization phase. The main key KPC is for example stored in a secure memory of the terminal C.

The main key KPC is also stored in a secure memory of the network server SR, for example in association with the identifier IdC of the terminal C and the identifier IdS of the application server SA.

The transmission device P, is configured to communicate with the management server SG via the network server SR, and via a gateway equipment.

In the example represented here, the transmission device P communicates with the gateway equipment EP1 via a radio linkup L1.

The transmission device P is also able to receive the radio signals sent by one or more terminals, for which it has obtained management rights, for example in the form of a request for management such as described later, and to send radio signals.

FIG. 1 represents an example of a first configuration state of the system SYS.

In this figure, the terminal C is situated in proximity to the gateway equipment EP2 and can communicate with this gateway equipment EP2 via a radio link L2.

Figure 2:
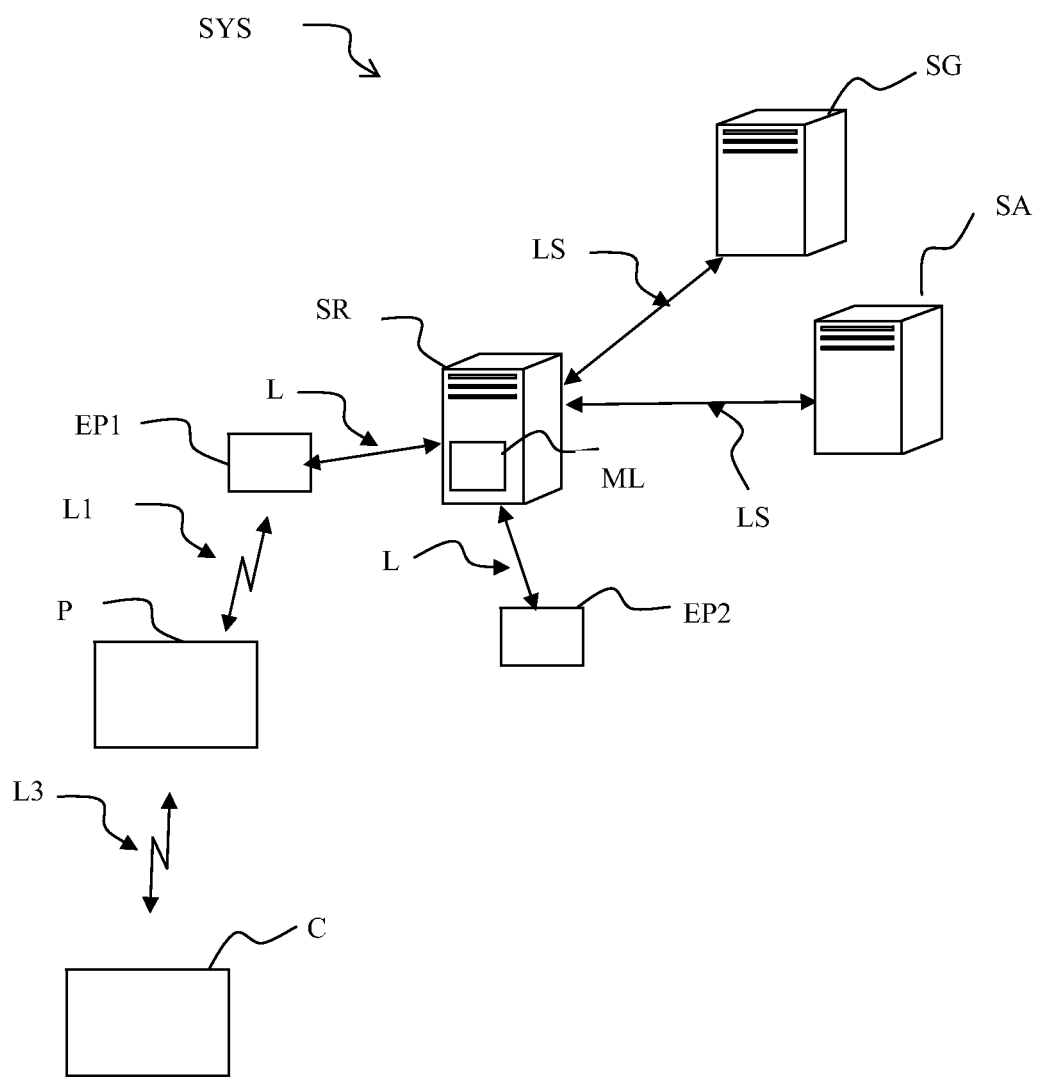
FIG. 2 is a diagram illustrating the system of FIG. 1 in a second configuration state.

FIG. 2 represents an example of a second configuration state of the system SYS.

In this figure, the terminal C is now situated in proximity to the transmission device P.

The terminal C has for example been moved. It is assumed here that the terminal C is now installed in a zone, called white zone, where it directly accesses neither a server of the network, nor a gateway equipment. More precisely, the radio signals sent by the terminal C do not reach as far as a gateway equipment EP1, EP2 of the network.

The terminal C is for example situated in a basement, for example in a cellar of a property, in a building made of sheet metal, etc.

The terminal C and the transmission device P then communicate via a radio link L3.

In the embodiment described, the radio links L1, L2 and L3 are linkups according to the LoRa low-bitrate and low-consumption technology. The radio signals sent and received are low-bitrate (less than 50 Kbits/s) long-range (i.e. of long range type) signals.

By way of alternative, one or more of the links L1, L2 and L3 are radio links of different type.

Figure 3:
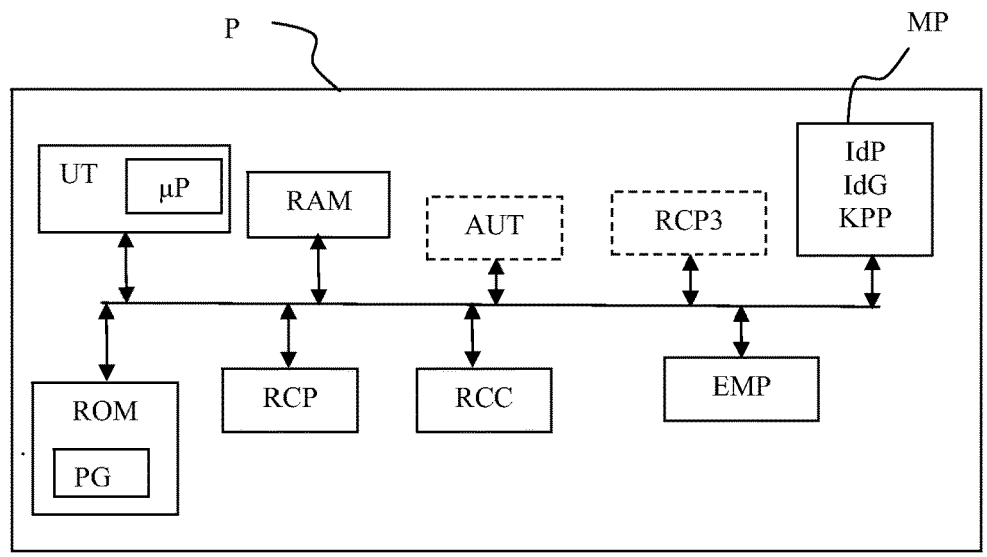
FIG. 3 is a diagram representing a transmission device able to implement a transmission method according to one embodiment of the invention.

As illustrated in FIG. 3, the transmission device P comprises in a known manner, in particular a processing unit UT equipped with a microprocessor, a read-only memory of ROM type, a random-access memory of RAM type.

Figure 4:
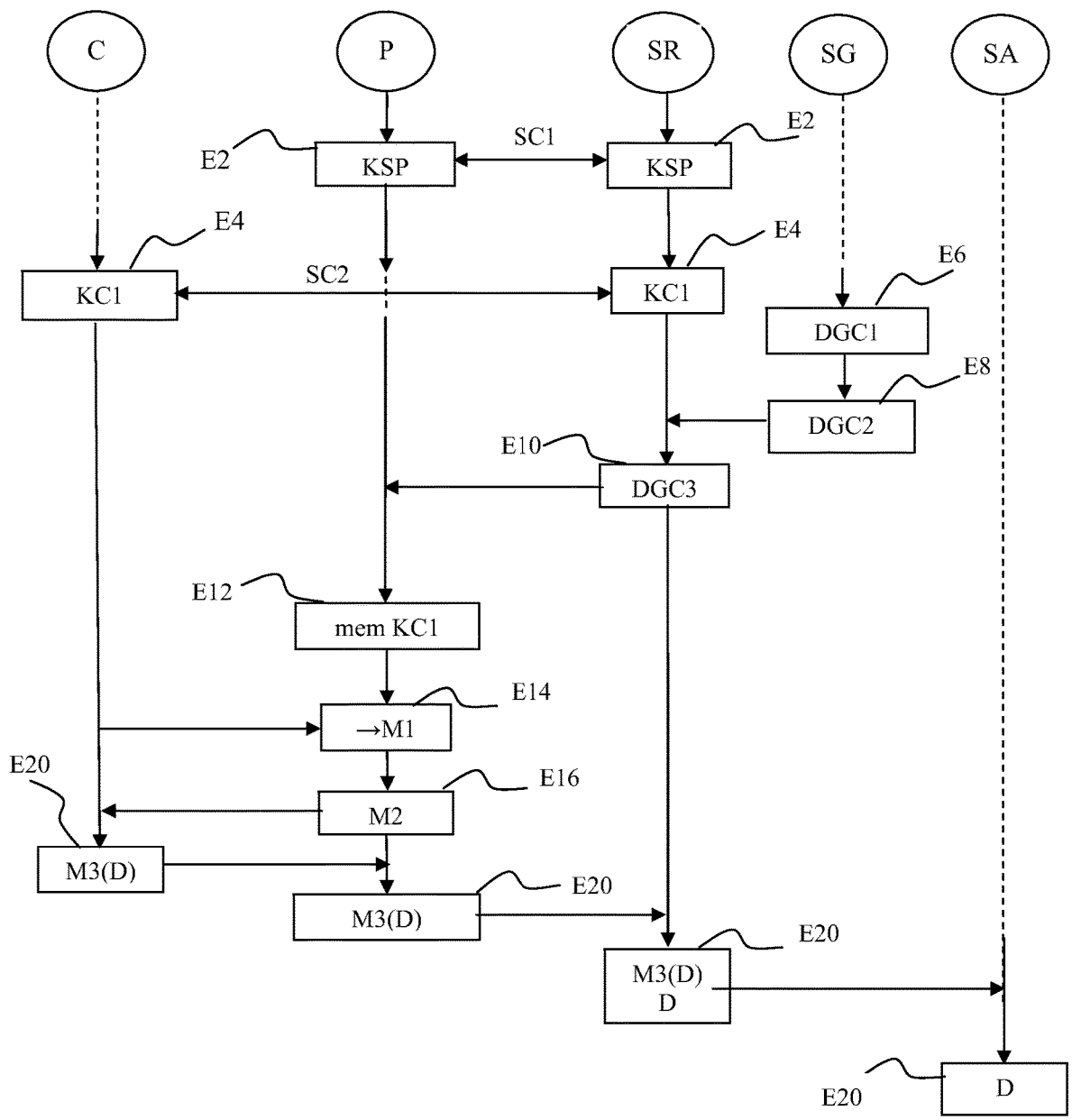
FIG. 4 is a flowchart illustrating the various steps of a management method according to a first particular embodiment of the invention.
Figure 5:
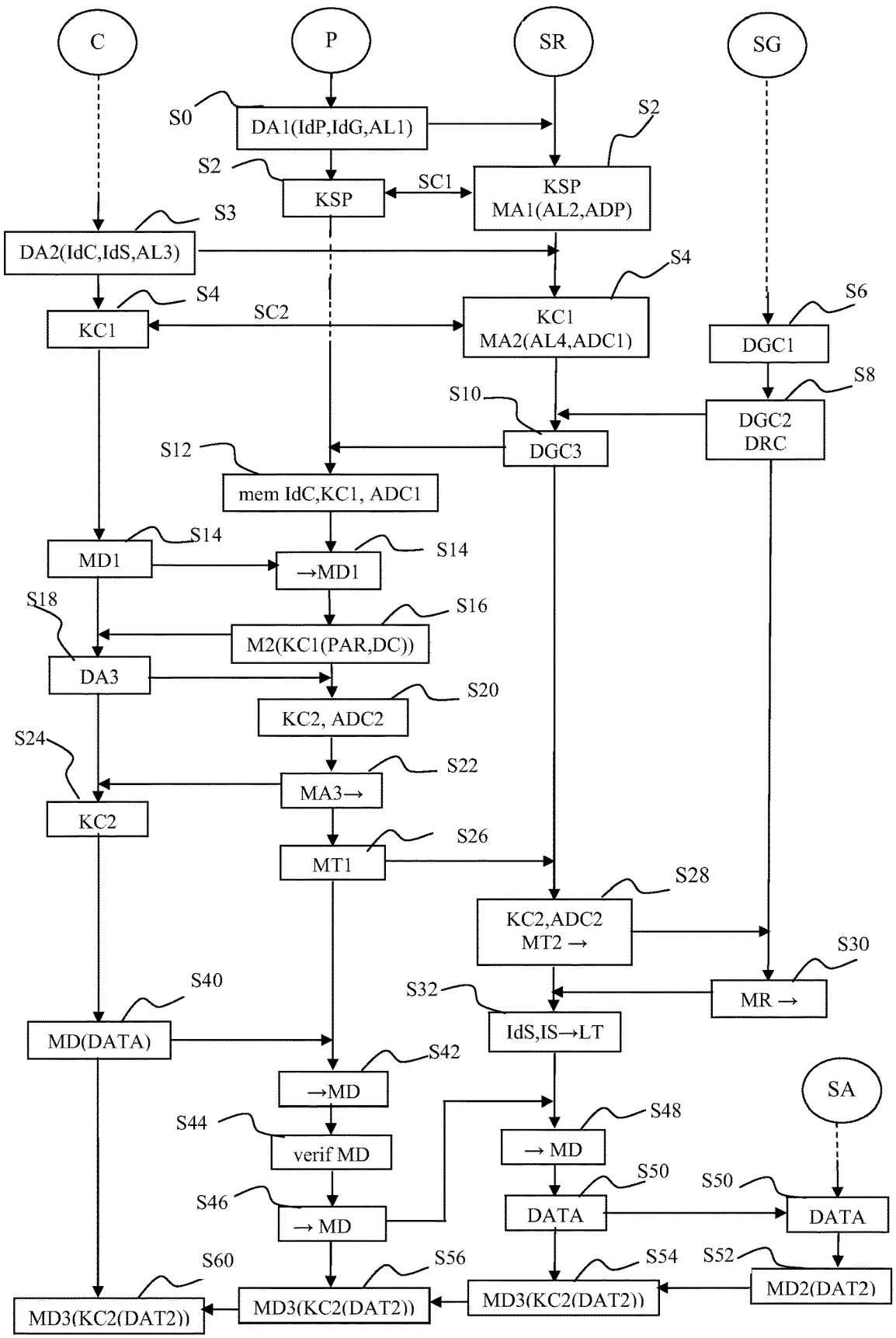
FIG. 5 is a flowchart illustrating the various steps of a management method according to a second particular embodiment of the invention.

The read-only memory of ROM type comprises registers storing a computer program PG comprising program instructions adapted to implement a management method according to one embodiment of the invention, described later with reference to FIG. 4 and to FIG. 5.

The transmission device P also comprises a memory MP, for example a secure memory, in which an identifier IdP of the transmission device P, an identifier IdG of the management server SG associated with the transmission device P and a main (or master) cryptographic key KPP have been recorded during a prior initialization phase, for example during its installation. The main key KPP is a key associated with the management server SG. It is shared by the transmission device P and by the network server SR.

The transmission device P also comprises a first reception module RCP, a second reception module RCC, a sending module EMC.

The first reception module RCP is configured to receive radio signals sent via the link L1, typically by the gateway equipment EP1.

The second reception module RCC is configured to receive radio signals sent by the terminal C.

The sending module EMC is configured to send radio signals.

The transmission device P can also comprise an authentication module AUT and a third reception module RCP3. The third communication module RCP3 is configured to communicate directly with the management server SG, for example via a wired or cellular link.

A first embodiment of a management method implemented in the system SYS will now be described with reference to FIG. 4.

During a step E2, the transmission device P and the network server SR establish between themselves a communication session SC1.

The establishment of the communication session SC1 comprises the generation of a session key KSP on the one hand by the transmission device P and on the other hand by the network server SR.

The session key KSP is generated on the basis of the main key KPP.

Information relating to the established session SC1 is recorded in association with an identifier of the transmission device P by the network server SR in a memory accessible to the network server, for example in the list LT of the memory ML.

In a known manner, the establishment of the session SC1 allows the transmission device P to transmit data messages destined for the management server SG. The data messages contain an identifier IdP of the transmission device P, an identifier IdG of the management server SG and data encrypted with the session key KSP. The data messages are received by the network server SR which decrypts the data with its session key KC1. Thereafter, the network server SR transmits, via the link LS, the decrypted data to the management server SG associated with the transmission device P.

In a reciprocal manner, the management server SG can transmit a message in response to a message received from the processing device P. This message is transmitted by the management server SG to the network server SR which encrypts its content with the session key KSP before transmitting it destined for the transmission device P.

During a step E4, a communication session SC2 is established between the terminal C and the network server SR.

The establishment of the communication session SC2 comprises the generation of a session key KC1 on the one hand by the terminal C and on the other hand by the network server SR.

The session key KC1 is generated on the basis of the main key KPC.

Information relating to the established session SC2 is recorded in association with an identifier IdC of the terminal C by the network server SR for example in the list LT of connected terminals.

In a known manner, the establishment of the session SC2 allows the terminal C to transmit data messages destined for the application server SA. The data messages contain an identifier IdC of the terminal C, an identifier of the application server SA and data encrypted with the session key KC1. The data messages are received by the network server SR which decrypts the data with its session key KC1. Thereafter, the network server SR transmits, via the link LS, the decrypted data to the application server SA associated with the terminal C.

In a reciprocal manner, the application server SA can transmit a message in response to a message received from the terminal C. This message is transmitted by the application server SA to the network server SR which encrypts its content with the session key KC1 before transmitting it destined for the terminal C.

During a step E6, the management server SG obtains a request for management DGC1 relating to the terminal C.

The request for management DGC1 is for example obtained by the management server SG subsequent to an action of a user, typically an operator. The request for management DGC of the terminal C is, for example input by the operator via a user interface displayed on a screen of the management server SG or of a terminal associated with the management server SG.

This action is for example performed subsequent to an alert sent by the application server SA. This alert is for example triggered by the application server SA subsequent to the non-reception during a predefined time interval of data messages originating from the terminal C.

This lack of reception of data is interpreted by the application server SA as a problem of radio coverage of the terminal C.

The absence of reception of data messages may originate from the movement, that is to say from a change of position, of the terminal C, from the movement of the gateway equipment EP2 situated initially in proximity to the terminal C, from the construction of one or more walls between the terminal C and the gateway equipment EP2, etc.

The request for management DGC1 contains an identifier of the terminal C, for example the identifier IdC, and an identifier of the management device P, for example the identifier IdP.

In the case where the system SYS contains a plurality of transmission devices, the transmission device P is chosen by the operator from among the transmission devices of the plurality.

By way of alternative, the request for management DGC1 does not contain any transmission device P identifier and the transmission device P is selected by the management server SG from among a plurality of transmission devices as a function of one or more predefined criteria. The transmission device chosen is for example the transmission device closest to the known location of the terminal C. This assumes that a position of each transmission device and that the position of the terminal C are at the disposal of the management server SG.

No limitation is attached to the choice of the transmission device P.

Step E6 is followed by a step E8 during which the management server SG dispatches to the network server SR, a request for management DGC2 of the terminal C by the transmission device P. The request for management DGC2 contains an identifier of the terminal C, for example the identifier IdC, and an identifier of the management device P, for example the identifier IdP.

Step E8 is followed by a step E10 during which the network server SR dispatches destned for the transmission device P, a request for management DGC3 of the terminal C.

The request for management DGC3 is for example transmitted to the transmission device P in response to a message transmitted by the latter.

The request for management DGC3 contains the identifier IdC of the terminal C and the session key KC1 generated during the step of establishing the communication session SC2 between the terminal C and the network server SR.

As an alternative, the request for management DGC3 also contains data used by the network server SR to communicate with the terminal C. These data comprise for example values of counters of frames, or more generally values used to avoid a replay attack.

The session key KC2 is for example extracted from the list LT of connected terminals, by the network server SR.

In a particular embodiment, the request for management DGC3 also contains authentication data such as for example the main key KPC associated with the terminal C.

Subsequent to the reception of the request for management DGC3 by the first reception module RCP of the transmission device P, the values contained in the request for management DGC3 are recorded in a memory of the transmission device P (step E12).

Later, during a step E14, the second reception module RCC of the transmission device P receives a message M1 sent by the terminal C and intended for the application server SA.

The message M1 is for example a message containing data, for example measurement data, encrypted with the session key KC1.

Step E14 is followed by a step E16 during which the sending module EMC of the transmission device P transmits one or more messages M2 to the terminal C. These messages M2 are encrypted by the transmission device P with the session key KC1.

The messages M2 contain configuration parameters of the terminal C. These configuration parameters make it possible to modify one or more parameters of the communication session SC2. They make it possible for example to reconfigure the radio signals sent or received by said terminal.

The configuration parameters contained in the message or messages M2 comprise for example a list of channels supported by the transmission device P and/or a list of channels to be invalidated because they are not supported by the transmission device P.

These configuration parameters allow the terminal C to update the list of radio channels on which the terminal C sends the messages.

The configuration parameters contained in the message or messages M2 can also comprise one or more values of response lags. These values of response lags make it possible to define time intervals which follow the sending of a message and during which the terminal C is listening for a response.

Subsequent to the reception of the configuration parameters, the terminal C takes these new configuration parameters into account.

Step E16 is followed by one or more steps E20 during which the terminal C communicates with the application server SA via the transmission device P and the network server SR.

More precisely, the messages M3 sent by the terminal C destined for the application server SA comprise data D previously signed by the terminal C with the session key KC1. They are intercepted by the transmission device P and re-sent by the latter destined for the network server SR.

The network server SR decrypts these messages M3 with the aid of the key KC1 that it holds and transmits their decrypted content D to the application server SA.

In a reciprocal manner, the messages transmitted by the application server SA are encrypted with the session key KC1 by the network server SR and transmitted by the latter destined for the terminal C. These messages are received by the transmission device P which transfers them to the terminal C.

In a variant embodiment, the messages M2 transmitted by the transmission device P during step E16 also comprise a request DC for sending of a new request for connection. Subsequent to the reception of the request DC, the terminal C re-sends a new request for connection.

The request for connection sent by the terminal C is intercepted by the transmission device P and a communication session SC3 is established between the transmission device P and the terminal C.

The establishment of the communication session SC3 comprises the generation of a session key KC2 on the one hand by the transmission device P and on the other hand by the terminal C.

Subsequent to the establishment of this communication session SC3, the messages transmitted by the terminal C are signed with the session key KC2.

These messages are intercepted by the transmission device P.

Thereafter, these messages or their content are transmitted by the transmission device P to the network server SR.

No limitation is placed on the transmission of the content of these messages.

By way of example, the messages received from the terminal C are decrypted by the transmission device P with the aid of the session key KC2 and then encrypted with the session key KSP shared by the transmission device P and the network server SR before being transmitted to the network server SR.

In a reciprocal manner, the messages transmitted by the application server SA are encrypted with the session key KSP by the network server SR and transmitted by the latter destined for the terminal C. These messages are received by the transmission device P which decrypts them with the session key KSP, encrypt them with the session key KC2 and sends them destined for the terminal C.

In this variant embodiment, the messages M2 comprise configuration parameters of the terminal and a request for connection DC.

By way of alternative, the messages M2 comprise the request for connection DC but do not comprise any configuration parameters of the terminal.

In the embodiment described, the request for management DGC3 is transmitted to the transmission device P via the network server SR and the gateway equipment EP1. In this case it is received by the first reception module RCP of the transmission device P.

By way of alternative, the transmission device P also comprises a wired or cellular communication module RCP3 and the request for management DGC3 is transmitted directly by the management server SG to the transmission device P via a wired or cellular link.

The request for management DGC3 is then received by the communication module RCP3 of the transmission disposition P. In the embodiment described, the communication session SC1 is established between the transmission device P and the network server SR and the communication session SC2 is established between the terminal C and the network server SR. By way of alternative, the communication session SC1 is established between the transmission device P and the management server SG and the communication session SC2 is established between the terminal C and the application server SA. In this alternative, the network server SR has a steering role.

A second embodiment of a management method implemented in the system SYS will now be described with reference to FIG. 5.

During a step S0, the authentication module AUT of the transmission device P transmits to the network server SR, a connection request DA1. The connection request DA1 is sent by the transmission device P, via the radio link L1. It is relayed to the network server SR by the gateway equipment EP1 via the link L.

The connection request DA1 contains the identifier IdP of the transmission device P, the identifier IdG of the management server SG with which the transmission device P is asking to be connected and a random value AL1 generated by the transmission device P.

The connection request DA1 is for example a message JoinRequest defined in the LoRaWAN™ standard.

During a step S2, subsequent to the reception of the request DA1, the transmission device P and the network server SR establish a communication session SC1.

The establishment of the communication link SC1 comprises an authentication step carried out on the one hand by the transmission device P and on the other hand by the network server SR.

More precisely, the network server SR generates a random value AL2. Next, it generates a session key KSP by applying a predefined mathematical function F1 by using the following parameters: the main key KPP, the random value AL1 received, the random value AL2.

The generation of a session key, also called derived key, on the basis of a main (or master) key is a technique known to the person skilled in the art and will not be described here.

The function F1 is for example an AES (for "Advanced Encryption Standard") function.

No limitation is placed on the function F1.

The network server SR also generates an address ADP for the transmission device P.

Next, the network server SR generates and sends, in response to the authentication request DA1, a message MA1 of acceptance of the connection. The message MA1 contains in particular the random value AL2 and the address generated ADP. It can also contain connection parameters such as for example a list of valid channels for communicating via the link L1 and/or a list of channels to be invalidated and/or a maximum response time in which a response to a message sent by the terminal must be received. This response time is for example 1 second.

The message MA1 is for example a message JoinAccept defined in the LoRaWAN™ standard.

Information relating to the connection, that is to say to the session established, is recorded by the network server SR in the list LT of connected terminals. This information is for example the identifier IdP of the transmission device P, the identifier IdG of the management server SG and the session key KSP.

Subsequent to the reception of the message MA1, the authentication module AUT of the transmission device P generates in its turn the session key KSP. The session key KSP is generated by applying the function F1 to the main key KPP stored in the memory MP of the transmission device P, the first random value AL1 generated by the transmission device P and the second random value AL2 received in the message MAL In the embodiment described, the session establishment comprises a mutual authentication of transmission device P and of the network server SR.

By way of alternative, the session key KSP for example generated by a security device (not represented) and previously recorded on the one hand in the transmission device P and on the other hand, in the network server SR.

Subsequent to step S2, the transmission device P on the one hand and the network server SR possess the same session key KSP. Stated otherwise, the session key KSP is shared by the transmission device P and the network server SR for the communication session between the transmission device P and the management server SG.

During a step S3, the terminal C sends a connection request DA2 to the application server SA.

The connection request DA2 contains the identifier IdC of the terminal C, the identifier IdS of the application server SA with which the terminal C is asking to be connected and a random value AL3 generated by the terminal C.

The connection request DA2 is for example a message JoinRequest defined in the LoRaWAN™ standard.

Step S3 is followed by a step S4 during which a communication session SC2 is established the terminal C and the network server SR.

More precisely, subsequent to the reception of the connection request DA2, the network server SR generates a random value AL4, a session key KC1 and an address ADC1 for the terminal C. The session key KSC1 is generated in a conventional manner by using the main key KPC, the random value received AL3 and the random value AL4.

Next, the network server SR generates and transmits a message MA2 of acceptance of the connection. The message MA2 contains in particular the random value AL4 and the address ADC1 generated. It can also contain configuration parameters of the terminal.

The message MA2 is for example a message JoinAccept defined in the LoRaWAN™ standard.

Information relating to the connection, that is to say to the session established, is recorded by the network server SR in the list LT of connected terminals. This information is for example the identifier IdC of the terminal C, the identifier IdS of the application server SA and the session key generated KC1.

Subsequent to the reception of the message MA2, the terminal C generates in its turn the session key KC1.

In a known manner, the establishment of the session SC2 allows the terminal C to transmit data messages destined for the application server SA. The data messages contain an identifier IdC of the terminal C, an identifier of the application server SA and data encrypted with the session key KC1. The data messages are received by the network server SR which decrypts the data with its session key KC1 recorded in the list LT in association with the identifier IdC of the terminal C. Thereafter, the network server SR transmits, via the link LS, the decrypted data to the application server SA associated with the terminal C.

In a reciprocal manner, the application server SA can transmit a message in response to a message received from the terminal C. This message is transmitted by the application server SA to the network server SR which encrypts its content with the session key before transmitting it destined for the terminal C.

During a step S6, similar to step E6 of the previous embodiment, the management server SG receives a request for management DGC1 relating to the terminal C.

The request for management DGC1 contains an identifier of the terminal C, for example the identifier IdC, and an identifier of the transmission device P, for example the identifier IdP.

Step S6 is followed by a step S8 during which the management server SG dispatches to the network server SR, a request for management DGC2 of the terminal C by the transmission device P.

In the embodiment described, the management server SG also dispatches to the network server SR, a request DRC for removal of the terminal C from the list LT of connected terminals.

The request for management DGC2 contains the identifier IdC of the terminal C and the identifier IdP of the transmission device P.

Step S8 is followed by a step S10 during which the network server SR dispatches destined for the transmission device P, a request for management DGC3 of the terminal C.

The request for management DGC3 is for example transmitted to the transmission device P in response to a message transmitted by the latter, for example an interrogation message.

The request for management DGC3 contains the identifier IdC of the terminal C, the address ADC1 of the terminal C generated during the step of establishing the communication session SC2, the session key KC1 also generated during the step of establishing the communication session SC2 and the main session key KP1 associated with the terminal C.

The session key KC1 and the address ADC1 of the terminal C are for example extracted from the list LT of connected terminals by the network server SR.

By way of alternative, the session key KC1 and the address ADC1 of the terminal C are obtained by the management server SG and transmitted to the network server SR in the request for management DGC2. This information is for example at the disposal of the application server SA and transmitted by the latter to the management server SG.

Also by way of alternative, the request for management DGC3 also contains data used by the network server SR to communicate with the terminal C. These data comprise for example values of counters of exchanged frames, for example values "UPLINK" and "DOWNLINK" defined in the LoRaWAN™ standard.

The data of the request for management DGC3 are encrypted by the network server SR with the session key KSP shared by the transmission device P and the network server SR.

Subsequent to the transmission of the message DGC3, the network server SR erases from the list LT of connected terminals, the identifier IdC of the terminal C as well as the information recorded in association with this terminal identifier.

Subsequent to the reception of the request for management DGC3, the transmission device P records the values contained in the request for management DGC3 in a memory of the transmission device P (step S12).

Later, during a step S14, the transmission device P intercepts a message MD1 sent by the terminal C and intended for the application server SA.

The message MD1 is for example a message containing data, for example measurement data, encrypted with the session key KC1.

Step S14 is followed by a step S16 during which the transmission device P transmits one or more messages M2 to the terminal C. These messages M2 are encrypted with the session key KC1.

These messages contain configuration parameters PAR of the terminal and a request DC for sending, by the terminal C, of a new request for connection.

By way of alternative, these messages do not comprise any session configuration parameters.

The configuration parameters PAR contained in the message M2 comprise for example a list of channels supported by the transmission device P and/or a list of channels to be invalidated because they are not supported by the transmission device P.

The updating of the list of channels is for example requested in the form of a "New Channel" request defined in the LoRaWAN™ standard.

The configuration parameters PAR contained in the message or messages M2 can also comprise one or more values of response lags. Such a response lag is for example a time interval between the end of the sending of a message by the terminal C and the start of a reception window during which the terminal C is listening for a response.

The updating of this lag is for example requested by using an option "MAC RXTimingSetupReq" defined in the LoRaWAN™ standard.

Subsequent to the reception of the request for connection DC, the terminal C re-sends a new request for connection DA3 (step S18).

The connection request DA3 contains the identifier IdC of the terminal C, the identifier IdS of the application server SA with which the terminal C is asking to be connected and a random value AL5 generated by the terminal C.

The connection request DA3 is for example a message "JoinRequest" defined in the LoRaWAN™ standard.

The connection request DA3 is handled by the transmission device P (step S20).

Next, the terminal C and the transmission device P establishment a communication session SC3 during which they authenticate one another mutually.

More precisely, subsequent to the reception of the connection request DA3, the transmission device P generates a random value AL6, a session key KC2 and an address ADC2 for the terminal C. The session key KC2 is generated in a conventional manner by using the main key KPC, the random value received AL5 and the random value AL6 (step S20).

Next, the transmission device P generates and transmits a message MA3 of acceptance of the connection. The message MA3 contains in particular the random value AL6 and the address ADC2 generated. It can also contain configuration parameters of the terminal C (step S22).

The message MA3 is for example a message JoinAccept defined in the LoRaWAN™ standard.

Subsequent to the reception of the message MA3, the terminal C generates in its turn the session key KC2 (step S24).

During a step S26, the sending module EMP of the transmission device P sends a message MT1 intended for the management server SG.

The message MT1 contains the identifier IdC of the terminal C, the session key KC2 generated by the transmission device P and the address ADC2 generated. The data contained in the message MT1 are encrypted with the session key KSP shared between the transmission device P and the network server SR.

As a variant, the message MT1 does not contain the management key KC2 but contains data making it possible to generate this key, for example the random values AL5 and AL6.

In a particular embodiment, the transmission device P commands the erasure from its memory of the previously generated key KC2, for example after dispatching of the message MT1.

Step S26 is followed by a step S28 during which the network server SR receives the message MT1 and obtains the session key KC2 and the address ADC2 by decryption of the data of the message MT1 with the aid of the key KSP stored in one of its memories.

Thereafter, the network server SR transmits a message MT2 containing the session key KC2 and the address ADC2 to the management server SG via the link LS.

During a step E30, the management server SG commands the recording of information IS relating to the session SC3 established in the list LT of connected terminals. Accordingly, it transmits to the network server SR, a message MR containing the identifier IdC of the terminal C, the session key KC2 and the address ADC2.

Step E30 is followed by a step E32 during which the network server SR receives the message MR and records information IS relating to the session SC3 established in association with the identifier IdC of the terminal C in the list LT of connected terminals. The recorded information is for example the identifier IdS of the application server SA, the session key KC2 and the address ADC2.

In a particular embodiment, the session key KC2 and the address ADC2 are also transmitted in a secure manner to the application server SA.

During a step S40, carried out after the steps described above, the terminal C having data DATA to be transmitted to the application server SA, generates and sends a message MD.

The data DATA are for example measurement data obtained by the terminal C.

More generally, the data DATA are data that the terminal C wishes to transmit to the application server SA and/or to the network server SR.

No limitation is placed on the type of the data DATA of the data message MD.

The message MD contains the identifier IdS of the application server SA, the address ADC2 of the terminal C as well as the data DATA encrypted with the session key generated KC2 generated by the terminal C.

The message MD is received by the transmission device P during a step S42.

The transmission device P verifies that the message MD originates from the terminal C and is destined for the application server SA (step S44).

If the verification is positive, the transmission device P commands the sending of the message MD by the transmission device P (step S46).

The data message MD sent by the terminal C, intended for the application server SA and received by the transmission device P is thus re-sent by the latter.

If the verification is negative, for example if the message MD received by the transmission device P is a message sent by a terminal for which the transmission device P has not received any management rights, for example the terminal identifier and the main key associated with this terminal, or if the message MD sent by the terminal C does not contain the identifier IdS of the application server SA, the message is not re-sent by the transmission device P.

The message MD, re-sent by the transmission device P is received by the network server SR during a step S48.

During a step S50, the network server SR verifies that the terminal C is registered in the list LT of connected terminals.

With the aid of the data IS recorded in association with the identifier IdC of the terminal C in the list LT, the network server SR can also perform integrity checks of the message MD.

If the terminal is not registered in the list LT or if the network server SR considers that the checks are not satisfactory, the process of processing the message MD by the network server SR stops.

Otherwise, the network server SR obtains the data DATA with the aid of the session key KC2 recorded in the list LT in association with the identifier IdC of the terminal C.

Next, the data DATA obtained are transmitted to the application server SA.

In the embodiment described, during step S46, the message MD is retransmitted without undergoing any processing on the part of the transmission device P.

By way of alternative, the message MD is encrypted with the session key KSP by the transmission device P before being transmitted.

Steps S40 to S50 can be repeated one or more times.

One of the steps S50 can be followed by a step E52 during which the application server SA having data DAT2 to be transmitted to the terminal C, generates and transmits a message MD2 destined for the terminal C.

Step S52 is for example carried out subsequent to the reception by the application server SA of an interrogation message or of a data message.

The message MD2 is received by the network server SR.

Subsequent to the reception of the message MD2, the network server SR encrypts the data DAT2 with the session key KC2 and transmits a message MD3 containing the encrypted data DAT2 destined for the terminal C (step S54).

The message MD3 is received by the transmission device P during a step E56.

During a step E58, the transmission device P re-sends the message MD3 received and the message MD3 is received by the terminal C during a step S60.

In the embodiment described, the session key KC2 generated by the transmission device P is transmitted by this device to the network server SR.

By way of alternative, the random value AL5 generated by the terminal C and the random value AL6 generated by the transmission device P are transmitted to the network server SR in place of the session key KC2. The session key KC2 is not transmitted. The session key KC2 is thus generated by the application server SA or by the network server SR by applying the mathematical function F2 to the random values AL5 and AL6 and to the main key KPC.

In another particular embodiment, the random value AL6 and the address ADC2 of the terminal are generated by the management server SG, by the network server SR or by the application server SA, and then transmitted to the transmission device P.

The session key KC2 might not be generated by the transmission device P. In this case, only the random value AL5 generated by the terminal C is transmitted in association with the identifier IdC of the terminal C during step S26. The session key KC2 is thus generated by the application server SA or by the network server SR by applying the mathematical function F2 to the random values AL5 and AL6 and to the main key KPC.

In the embodiment described, during the establishment of a session with an application server, for example the management server SG or the application server SA, the authentication of a terminal or of a transmission device is carried out by the network server SR.

As a variant, such an authentication can be carried out by the management server, the application server SA or another equipment of the network, for example an authentication server of the network. In this variant, the data associated with an application server and necessary for the implementation of the authentication are placed at the disposal of this server.

A secondary key generated on the basis of a main key can be placed at the disposal of the network server which thus authenticates and/or decrypts the messages originating from a terminal or from a transmission device before transmitting them, preferably via a secure link, to the application server concerned.

Conversely, the messages generated by an application server are signed and/or encrypted with the secondary key by the network server before transmission to a terminal or to a transmission device.

A secondary key generated on the basis of a main key can also be placed at the disposal of the application server which can then be in charge of encrypting the messages before transmission and decrypting the received messages.

In the embodiment described, a session key is generated during each mutual authentication. A session key KSP is generated during the mutual authentication of the transmission device P and of the management server SG, a session key KC1 is generated during the mutual authentication of the terminal C and of the application server SA and a session key KC2 is generated during the mutual authentication of the terminal C and of the transmission device P.

Within the meaning of the LoRaWAN™ standard, these session keys are application session keys.

In the architectures of LoRaWAN™ type, the security of the exchanges between the terminals and the application servers is ensured at two distinct levels, i.e., at the network level via diverse integrity checks carried out by the server of the network playing the intermediaries between the terminals and the application servers and by the terminals themselves, and at the application level, via the encryption/decryption of the application data exchanged between the terminals and the application servers. Each of these mechanisms relies, during each session established by a terminal with an application server via the server of the network, on the known AES encryption algorithm used in the LoRaWAN™ protocol parametrized sometimes by means of network session cryptographic keys, sometimes by means of session application cryptographic keys. These cryptographic keys are here of dimension 128 bits. It is however noted that the invention makes it possible to readily envisage symmetric encryption algorithms other than the AES encryption algorithm, as well as other sizes of keys.

The invention also applies to this architecture.

Thus, in a variant embodiment, during the mutual authentication requested by the transmission device P, the authentication request DA1 sent by the transmission device P is intercepted by a network server SR of the LoRa™ network.

Subsequent to the reception of the authentication request DA1, the network server SR generates on the one hand a network key KRP and on the other hand the session key KSP.

Likewise, the transmission device P also generates in addition to the session key KSP, the network key KRP.

The messages transmitted by the transmission device P destined for the management server SG contain data encrypted by the session key KSP and then signed by the network key KRP. Each message is received by the network server SR which verifies the integrity and the authenticity thereof by virtue of its network key KRP, and transmits them to the management server SG which decrypts it with the session key KSP. By way of alternative, if it has been mandated to do so, the network server SR can decrypt the message with the session key KSP and transmit the decrypted message to the management server SG via the, preferably secure, link LS.

Likewise, during the step of mutual authentication between the terminal C and the network server SR, a network key KRC2 can be generated on the basis of the main key KPC on the one hand by the terminal C and on the other hand by the network server SR of the LoRa™ network.

Likewise, during the step of mutual authentication between the terminal C and the transmission device DP, a network key KRC2 can be generated on the basis of the main key KPC on the one hand by the terminal C and on the other hand by the transmission device P.

The messages transmitted thereafter by the terminal C are then also signed by the network key KRC2.

As a variant of this embodiment, during the reception of a data message encrypted with the session key KC2 and signed with the network key KRC2, originating from the terminal C, the transmission device P obtains with the aid of the network key KRC2, the data DATA encrypted with the session key KC2 that is to say KC2(DATA). It then encrypts these encrypted data (KC2(DATA)) with the session key KSP and then signs them with the network key KRP before transmitting the message thus obtained.

The message is obtained by the network server SR which obtains and transmits the data encrypted with the session key KSP to the management server SG. This message is received by the management server SG which obtains, with the aid of its key KSP, the data encrypted with the key KC2 and transmits the message obtained. This message is received finally by the application server SA which obtains the data DATA with the aid of the key KC2.

Although the present disclosure has been described with reference to one or more examples, workers skilled in the art will recognize that changes may be made in form and detail without departing from the scope of the disclosure and/or the appended claims.

The invention claimed is:

1. A management method comprising the following acts implemented by a transmission device able to communicate via a first radio link with a first gateway equipment forming a node of a telecommunication network and configured to communicate with an associated management server via said first gateway equipment and via a network server of said network:
   receiving from said management server a request for management of a terminal able to communicate via a second radio link with a second gateway equipment of the network and configured to communicate with an associated application server via the second gateway equipment of the network and said network server and having established a communication session with the network server and/or the application server, wherein at least one session key that is generated while establishing the communication session is shared between the terminal and the network server and/or the application server, and wherein said request for management contains at least one identifier of said terminal and said at least one session key;
   subsequent to the receiving of the request for management, receiving at least one message sent by said terminal; and
   sending, in response to said message, at least one response message encrypted with said session key received.

2. The management method as claimed in claim 1, in which said request for management is received via said first gateway equipment and via said network server.

3. The management method as claimed in claim 1, in which said at least one response message contains at least one configuration parameter of the terminal.

4. The management method as claimed in claim 3, in which said at least one configuration parameter comprises a list of at least one radio channel to be validated or invalidated by the terminal.

5. The management method as claimed in claim 3, in which said at least one configuration parameter comprises at least one lag value to be complied with between a message sent and a message received by the terminal.

6. The management method as claimed in claim 1, in which said at least one response message contains a request for sending by said terminal of a request for connection.

7. The management method as claimed in claim 1, in which said request for management contains authentication data allowing establishment by said transmission device of a communication session with the terminal.

8. The management method as claimed in claim 1, in which the method comprises subsequent to the sending of said at least one response message, an act of receiving a request for connection to said application server sent by said terminal and an act of establishing a communication session between said terminal and said transmission device.

9. The management method as claimed in claim 8, in which the method comprises, subsequent to the establishment of the communication session between said terminal and said transmission device, an act of dispatching establishment data of said communication session to said network server.

10. The management method as claimed in claim 1, in which said request for management is received in response to a message sent by the transmission device.

11. A transmission device able to communicate via a first radio link with a first gateway equipment forming a node of a telecommunication network and configured to communicate with a management server via said first gateway equipment and via a network server of said network, wherein the transmission device comprises:

a processor; and a non-transitory computer-readable medium comprising instructions stored thereon, which when executed by the processor configure the transmission device to perform acts comprising:

receiving from said management server a request for management of a terminal able to communicate via a second radio link with a second gateway equipment of the network and configured to communicate with an associated application server via the second gateway equipment of the network and said network server and having established a communication session with the network server and/or the application server, wherein at least one session key that is generated while establishing the communication session is shared between the terminal and the network server and/or the application server, and wherein said request for management contains at least one identifier of said terminal and said at least one session key;

intercepting, subsequent to receiving the request for management, at least one message sent by said terminal; and sending, in response to said message, at least one response message encrypted with said session key received.

12. A non-transitory computer readable recording medium on which a computer program is recorded, comprising instructions for executing a management method when the instructions are executed by a transmission device, which is able to communicate via a first radio link with a first gateway equipment forming a node of a telecommunication network and is configured to communicate with an associated management server via said first gateway equipment and via a network server of said network, and wherein the instructions configure the transmission device to perform acts comprising:

receiving from said management server a request for management of a terminal able to communicate via a second radio link with a second gateway equipment of the network and configured to communicate with an associated application server via the second gateway equipment of the network and said network server and having established a communication session with the network server and/or the application server, wherein at least one session key that is generated while establishing the communication session is shared between the terminal and the network server and/or the application server, and wherein said request for management contains at least one identifier of said terminal and said at least one session key;

subsequent to the receiving of the request for management, receiving at least one message sent by said terminal; and sending, in response to said message, at least one response message encrypted with said session key received.

* * * * *